United States Patent
Bradford

(10) Patent No.: US 6,941,514 B2
(45) Date of Patent: Sep. 6, 2005

(54) SYSTEM AND METHOD FOR PRIORITY-BASED WORK ORDER SCHEDULING

(75) Inventor: David L. Bradford, Cocoa, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 712 days.

(21) Appl. No.: 09/892,474

(22) Filed: Jun. 28, 2001

(65) Prior Publication Data

US 2004/0260668 A1 Dec. 23, 2004

Related U.S. Application Data

(60) Provisional application No. 60/286,967, filed on Apr. 30, 2001.

(51) Int. Cl.$^7$ .......................... G06F 17/00; G06F 17/30
(52) U.S. Cl. ............................. 715/700; 705/8; 705/9; 705/32
(58) Field of Search ................................. 715/700, 733; 705/8, 9, 32; 700/100, 102, 97, 99, 101; 379/266.01

(56) References Cited

U.S. PATENT DOCUMENTS

| | | | | |
|---|---|---|---|---|
| 5,093,794 A | * | 3/1992 | Howie et al. ............... 700/100 |
| 5,911,136 A | * | 6/1999 | Atkins ......................... 705/36 |
| 5,913,201 A | * | 6/1999 | Kocur ............................ 705/9 |
| 6,115,640 A | * | 9/2000 | Tarumi ........................ 700/99 |
| 6,438,436 B1 | * | 8/2002 | Hohkibara et al. ........... 700/97 |
| 6,463,346 B1 | * | 10/2002 | Flockhart et al. ........... 700/102 |
| 2002/0010615 A1 | * | 1/2002 | Jacobs ........................... 705/9 |
| 2002/0073226 A1 | * | 6/2002 | Sridhar et al. .............. 709/235 |
| 2002/0111842 A1 | * | 8/2002 | Miles ............................ 705/8 |
| 2003/0167199 A1 | * | 9/2003 | Thomann et al. ............. 705/10 |

* cited by examiner

Primary Examiner—Joseph Feild
Assistant Examiner—Paul Nguyen-Ba
(74) Attorney, Agent, or Firm—Walters & Zimmerman; Jennifer Medlin; Todd Mitchem

(57) ABSTRACT

A priority-based work order scheduling system includes a graphical user interface having displays for managing work orders stored in the system. Work orders are entered into the system via a work order entry computer. A time estimate for completing the work order is determined. Work order data associated with the work order is stored along with the time estimate to complete the work order in a database management system. A priority is assigned to the work order and stored in the database management system. Operationally, the scheduling system is used during scheduling meeting to assist in making scheduling determinations, and for updating work order data stored in the database management system. Work order data can be updated by engineers having authority to perform the updates outside of a scheduling meeting.

27 Claims, 8 Drawing Sheets

|  |  |  |  |  | Rem |  |  |  |  | Site Pre |  |  |  |
|---|---|---|---|---|---|---|---|---|---|---|---|---|---|
| PRG | PRI | JOB | ENG | Rsrc | Hrs | Ca | HW | Pigs | Prmit | Rdy | CT | Go | Description |
| | 1 | 2 | 3 | 4 | 5 | 6 | 7 | 8 | 9 | 10 | | | |
| | 11 | 12 | 13 | 14 | 15 | 16 | 17 | 18 | 19 | 20 | | | |
| | 4 | 03X0002N | Joe | FPL6 | 460.3 | NA | NA | NA | NA | NA | NA | N | Site 1 |
| | 1 | 03X0028N | John | FPC3 | 20.4 | NA | NA | NA | R | NA | NA | N | Subdivision 2 |
| | 3 | 03X0454N | Bob | FPL6 | 130.5 | R | NA | NA | NA | NA | NA | N | Corner of Maple and Elm |
| | 1 | 03X0023N | John | FPL6 | 45.4 | NA | NA | NA | NA | NA | NA | N | 96th Ave Apartment |
| | 4 | 03X0322N | Bob | FPC3 | 34.6 | R | NA | NA | R | NA | NA | N | Isdn Order |
| | 2 | 03X0012N | Sally | FPC3 | 324.5 | NA | NA | NA | NA | NA | NA | N | Cell Tower 1 |
| | 3 | 03X0045N | Joe | FPL6 | 123.3 | NA | NA | NA | NA | NA | NA | N | 100 Main St. |

FIG.4

JOB 03X003N   Priority 1 ☐ 2 ☐ 3 ☐ 4 ▨

| Category | N | O | R | NA | Category | Y | N | NA |
|---|---|---|---|---|---|---|---|---|
| Plugs | ☐ | ☐ | ☐ | ▨ | Site Ready | ☐ | ☐ | ▨ |
| Cable | ☐ | ☐ | ☐ | ▨ | Pre-CT | ☐ | ☐ | ▨ |
| Hardwire | ☐ | ☐ | ☐ | ▨ | Go | ☐ | ▨ | ☐ |
| Permit | ☐ | ☐ | ☐ | ☐ | Ehab Go | ☐ | ▨ | ☐ |

Notes

```
*01/21/01*
*02/02/01*John to check [Entire job complete]
                        [Action needed]
*02/10/01*
```

Contract Notes    Line Notes    Splice Notes    DLC Notes    Special Notes

☐ Contract Complete   ☐ Line Complete   ☐ Splice Complete   ☐ DLC Complete   ☐ Job Not Received
☐ Contract IP         ☐ Line IP         ☐ Splice IP         ☐ DLC IP         ☐ Entire Job Complete
☐ Contract Ready      ☐ Line Ready      ☐ Splice Ready      ☐ DLC Ready      ☐ Action Needed
☐ On Contract Log     ☐ FPL                                                   ☐ Zero Spare Box
                      ☐ CATV                                                  ☐ 1 to 6 Spare
                      ☐ Ready to Pull
                      ☐ Pole Rem Req Update Job Information

[UPDATE]

FIG.5

| RESOURCE STATISTICS REPORT | | | |
|---|---|---|---|
| Resource | Total Remaining Hours | Employees on Load | Week of Work |
| Bob | 330.5 | 15 | 0.6 |
| Ted | 148.3 | 13 | 0.3 |
| Alice | 3380.6 | 10 | 8.5 |
| Carol | 4384.3 | 8 | 13.7 |
| Bill | 7.0 | 9 | 0.0 |
| Tom | 160.7 | 11 | 0.4 |
| Erica | 3514.4 | 13 | 6.8 |

FIG.7

| ENGINEER PRIORITY REPORT | | | | | |
|---|---|---|---|---|---|
| ENGINEER | Priority | 1 | 2 | 3 | Total |
| Bill |  | 5 | 3 | 2 | 10 |
| Bob |  | 5 | 5 | 5 | 15 |
| John |  | 2 | 4 | 1 | 7 |
| Joe |  | 6 | 2 | 5 | 13 |
| Sally |  | 4 | 3 | 5 | 12 |
| Sam |  | 5 | 2 | 1 | 8 |

FIG.8

SYSTEM AND METHOD FOR PRIORITY-BASED WORK ORDER SCHEDULING

This application claims the benefit of U.S. Provisional Patent Application 60/286,967, filed Apr. 30, 2001.

BACKGROUND

1. Field of the Invention

The present invention relates generally to computerized scheduling systems. More particularly, the present invention relates to managing work order scheduling according to priority levels that are assigned to work order requests.

2. Background of the Invention

Utility companies that provide services such as telecommunications capabilities, electric power, natural gas, or cable television, are generally organized into particular geographical regions for providing installation, build out, and repair services ("installations"). Engineers, designers, and other managers ("engineers") are primarily responsible for designing and managing projects and work orders within respective geographical areas, or zones. The engineers create specifications for various project builds, and store them in the form of work orders to be completed. Construction crews and foremen, linemen, and other service agents ("construction agents") are responsible for performing the installations required to complete the work orders to implement the engineers' designs. A significant problem that arises in conventional work order scheduling is the allocation of scarce resources (e.g., construction agents and equipment) to complete the work orders in a timely and efficient manner.

Work orders can be broken down into a set of tasks that must be completed to process the work order. Each of these tasks can be assigned a time required to complete the task. In this manner, the time required to complete a particular work order can be estimated by summing the time estimates for completing the series of tasks that must be performed to process the work order.

Engineers and construction agents generally participate in periodic scheduling meetings to schedule installations to complete new work orders and discuss the status of pending work orders. During these meetings, the engineers and construction agents determine how to allocate limited installation resources (e.g., construction agents and equipment) to complete new and pending work orders. The number of construction hours available to a particular construction team is a function of the number of construction agents in the team, and the length of their work weeks in hours. For example, if a team of construction agents in a particular area has 10 construction agents working a 40-hour week, that area has 400 construction hours per week that it can allocate. These construction hours are assigned to work order tasks during the scheduling meeting.

During the scheduling meetings, engineers negotiate with one another to determine when particular work orders will be processed. Engineers whose area (or zones) require immediate service are expected to negotiate with engineers with less urgent needs to maximize the effective allocation of the construction agent hours in the entire service region. Customer complaints, desires for new or expanded service and service upgrades are examples of the parameters engineers consider to determine the urgency of particular work orders. At these meetings, construction agents may also provide status updates to the engineers for pending work orders for which service has begun.

Engineers are evaluated on their ability to process work orders. Engineers who do not process work orders effectively or efficiently may be ineligible for bonuses and/or subject to reprimand. Accordingly, engineers have incentives to lobby intensively for the completion of their work orders, even if this means exaggerating the urgency of their work orders. That is, certain engineers may seek to schedule their work orders without regard to the consequences for other, more pressing work orders. As a result, construction agents are often assigned in an inefficient manner, and work orders having bona fide urgency can be delayed for work orders whose urgency has been exaggerated. Further scheduling is often a "personality contest" where engineers having a close personal or working relationship with the scheduling manager have their projects scheduled first despite inefficiencies that are likely to occur.

An additional problem with conventional scheduling of work orders is that the scheduling meetings are generally memorialized only in the individual notes of the participants. Consequently, any knowledge transferred during the meeting is only as good as the notes that are taken. These notes are often incomplete or inaccurate. Such incomplete notes or misunderstandings can also result in ineffective work order scheduling. Moreover, where resource allocation disagreements result in impasse, work order schedules do not result from the scheduling meeting. This is unacceptable because it may allow resources to become idle until such time as the impasse is resolved and a work order schedule is in place.

Another factor affecting the efficiency of work order processing is that engineers can communicate with one another or with construction agent managers outside of the scheduling meeting to make arrangements for completing work orders. Such conversations do not take into account the needs of other engineers. Moreover, such out-of-meeting dealing reduces the possibility of meaningful coordination that occurs during the scheduling meeting.

Another problem with conventional work order tracking systems is that engineers may not receive timely updates concerning the status of existing work orders to report to their customers or respond to customer queries. Consequently, engineers are not always able to respond to customer queries in a satisfactory manner.

SUMMARY OF THE INVENTION

To overcome the problems and difficulties associated with conventional work order scheduling systems as described above, the present invention is directed to a system and method for priority-based scheduling of work orders. The system includes a work order entry computer into which work order information is entered in the form of work order tickets. The work order information contained in the work order tickets is converted to a series of tasks. Each task is assigned an estimate of the amount of time required to complete the task. The sum of the time estimates required to complete each task for all tasks required to complete a work order is an estimate of the time required to complete the work order. The work order information and time required to complete the work order is stored in a database management system.

Priorities are assigned by the engineers responsible for particular work orders. The priorities indicate the relative importance of a particular work order. Work orders are scheduled according to these assigned priorities. In an ideal system, all work orders having a higher priority are completed before any work order having a lower priority is begun. But in actual implementation, it is allowable that work at different priority levels can occur simultaneously.

This allows for resources that might be on a high priority that fails for some reason to perform work on a lower priority work order. No work is performed on work orders having a priority level of 4. Thus, a priority level of 4 is essentially a holding condition. The default is to assign work orders a priority level of 4.

To prevent engineers from assigning the highest priority to all of their work orders, engineers are allocated a predetermined number of priorities for a pre-determined number of priority levels. For example, in an embodiment of the present invention, there are 4 priority levels, 1–4, with 1 being the highest. Each engineer is allotted 5 priority assignments for each priority level 1–3 to assign priorities to the work orders that he or she is responsible for. Thus, an engineer can assign up to 5 work orders priority level 1, up to 5 work orders priority level 2 and up to 5 work orders priority level 3. As work orders are completed, the engineer is given the priority level of the job to assign. Thus, if an engineer has previously assigned 3 work orders priority level 1, the engineer can only assign 2 additional work orders priority level 1. When one of the 3 previously assigned priority level 1 work orders is completed, the engineer will be able to assign an additional priority 1 work order. In certain situations, engineers can borrow a priority level from another engineer.

To access work order information stored in the database, a user navigates displays in a graphical user interface. The displays include a search window for allowing the user to search the work order information, a report window for generating reports and an update window to access and update work order information.

The search window allows the user to enter search terms for searching the work order information in the database. Categories are provided to limit the search. For example, a user can search on the engineer's name or the job's name. Within each category, the user can search for a particular term. Multiple categories and search terms can be searched.

The report window allows a user to select a report format to output at least a portion of the work order data. Any desired report can be generated, and specific reports are generally implementation dependent. Reports provide a convenient format for reviewing the work order data.

The update window displays a record associated with a particular work order. For example, the update window displays the priority of the work order, the category of the work order, the engineer creating the work order, and other information. Any of this information can be changed using the update window.

The work order data is updated as work is reported to provide a mechanism for tracking the status of work orders. For example, when tasks are completed, the time remaining to complete the work order is reduced. When subsequent reports are generated, the reports display the reduced time remaining to complete the work order. Consequently, the present invention tracks the progress of work order processing. Preferably, these updates are performed at night via the work order update computer.

BRIEF DESCRIPTION OF THE DRAWINGS

FIG. 4 is an exemplary scheduling display that is shown to a user after the user makes the selection from the scheduling window.

FIG. 5 illustrates a work order display according to one embodiment of the present invention.

FIG. 7 illustrates a Resource Statistics display.

FIG. 8 is an exemplary priority report that shows, by engineer, what priorities the engineer has used and what priorities remain.

The present invention is described in greater detail in the detailed description of the invention, the appended drawings and the attached claims.

DETAILED DESCRIPTION OF THE INVENTION

Figure 1:
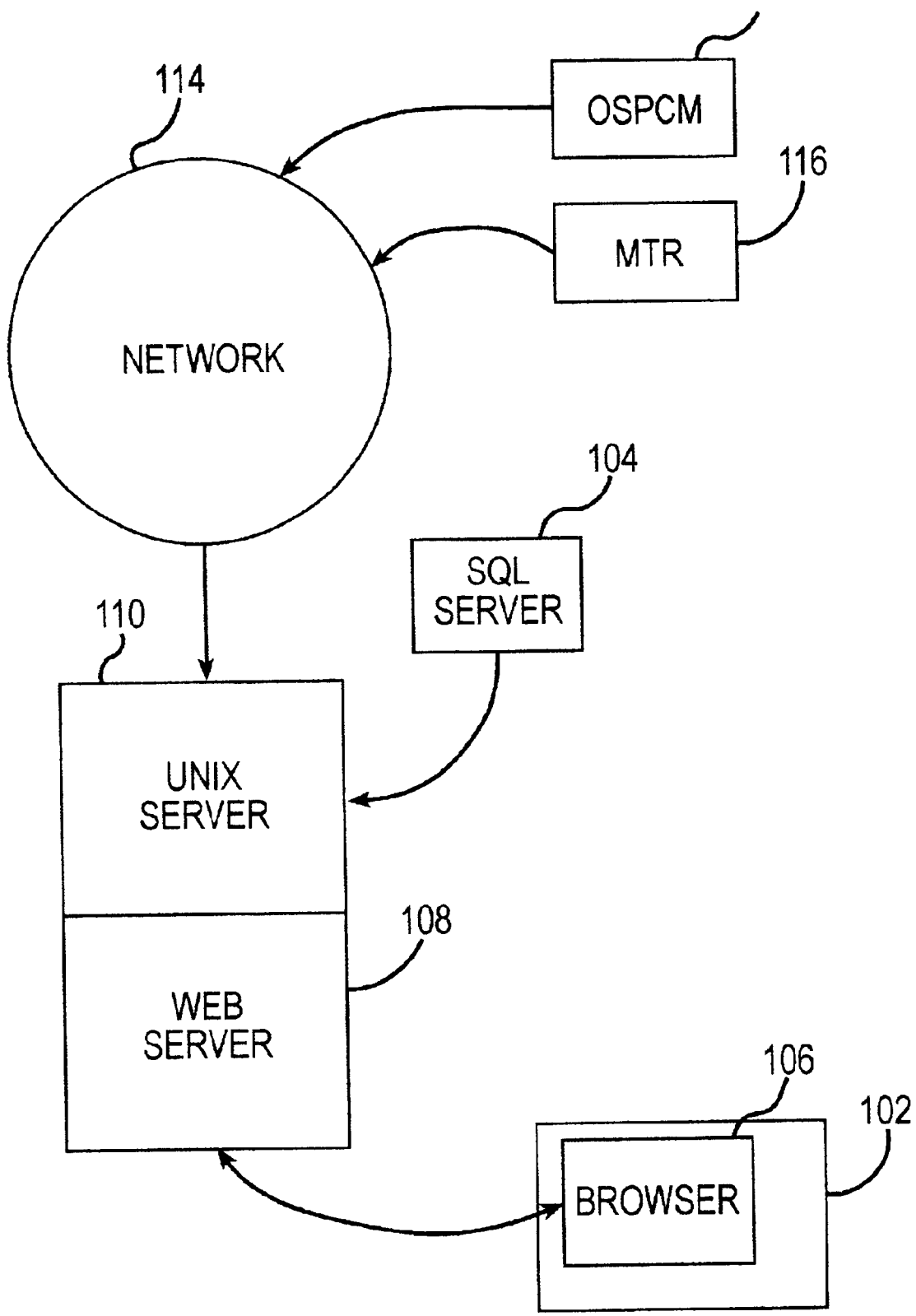
FIG. 1 is a schematic diagram of a system for priority-based work order scheduling according to an embodiment of the present invention.

FIG. 1 is a schematic diagram of a system for priority-based work order scheduling according to a first embodiment of the present invention. A user using computer 102 submits an information request to obtain information regarding current work orders. Preferably, the work order information is a stored on a database management system (DBMS) 104. DBMS 104 can be any database management system, for example, a SQL server. Preferably the user accesses the information using a web browser 106, which is coupled to DBMS 104 via a web server 108, and a Unix server 110 as shown in FIG. 1.

Web server 108 can be any web server. For example, it could be the well-known Apache web server. Preferably, web server 108 executes the PHP language. The PHP language is a web-based scripting language. The PHP language outputs HTML to communicate with web browser 106.

In operation, the user submits a work order information request using web browser 106. This request is sent to web server 108, which converts the request into a database query. Web server 108 sends the database query to DBMS server 104. DBMS server 104 processes the request and sends the requested information back to Web server 108. Web server 108 sends the requested information back to web browser 106 which displays the information to the user.

Work order information is stored in DBMS server 104 in the following manner. Work order information in the form of work order tickets is input via a work order entry system 112 at the design time of the engineering work order or later. Work order entry system 112 converts the work order into a series of tasks that need to be performed to complete the work order. Alternately, an operator converts the work order into a series of tasks using work order entry system 112. Work order entry system 112 is any computer in which work order ticket information can be entered and converted to task information. Work order entry system 112 creates reports from the information it receives. These reports are available for printing or storage in a file, for example, a comma-delimited file. The information comprising these reports is updated periodically as described below. Preferably, the information is updated daily.

Periodically, or on demand, the work order information is sent to DBMS server 104 through a network 114 and Unix server 110. The work order information can be any information that is stored in work order entry system 112. Preferably, network 114 is an intranet that is not accessible generally over the Internet. Limiting access provides security to the work order system of the present invention.

A work order update system 116 allows for updates to be made for current work orders in the system. For example, as tasks are completed for particular work orders, the time required for that particular task is added back to the available time that construction agents working on that task have. In addition, the time required to complete the work order is reduced by the same amount. For example, if a task required 8 hours to complete, when it is finished the available time for the construction agent assigned to that task is increased by 8, and the time required to complete the work order is decreased by 8. In addition, as work orders are completed, the priorities associated with that task are freed for the engineer assigning the work order. Work order update system 116 provides the updated information to work order entry system 112.

In the present invention, job priorities are used to establish the relative importance of work orders and thereby the order in which work orders are scheduled for completion. The present invention forces the engineers have to determine the relative priorities of the jobs for which they are responsible. The engineers generally determine how to select the priorities on the basis of external pressures, for example, whether there are other immediate service order requests, new housing subdivisions or other subdivisions requiring service and other pressures.

Jobs having the highest priority are assigned a priority of 1, and are scheduled to be worked on first. Jobs having the next highest priority are assigned a priority of 2. These jobs are preferably worked on after all jobs having priority 1. In other implementations of the present invention, there is no requirement that jobs having a higher priority are completed prior to beginning work on jobs having lower priorities. Jobs having the next highest priority are assigned a priority of 3. These jobs are worked on after all jobs having priority 1 or 2 are completed. Jobs having priority 4 are not worked on. Initially, all jobs are assigned a priority of 4. Therefore, jobs will not be worked on until an engineer assigns them a priority of 1, 2 or 3.

To prevent engineers from assigning all jobs a priority of 1, limited numbers of each class of priority are allocated to each engineer. For example, each engineer may be given 5 priority 1's, 5 priority 2's and 5 priority 3's. The engineer can allocate these priorities to his or her work orders as he or she deems appropriate. Allocating priorities to engineers in this manner "levels the playing field" so that no one engineer can command more than an appropriate share of resources. That is, unlike the situation found in conventional work order scheduling, using the system of the present invention largely eliminates the advantage engineers who are more articulate or friendlier with scheduling managers would otherwise have over their peers. With the present invention, they, like other engineers, are allocated a fixed number of priorities at each level to assign to their work orders.

The system tracks priority use by the engineers. One way of tracking the priorities is to have a priority table of remaining priorities. The priority table has an entry for each engineer. Each entry contains the number of priorities at each level remaining for each engineer. The table is initialized so that the engineer has the maximum number of priorities for each level. If the value of the table for a particular engineer for a particular priority level is 0—indicating that the engineer has assigned all or his or her allocated priorities of the level to other jobs—that engineer cannot assign that particular priority level, and must choose a different priority level. When an engineer attempts to change a priority for a job, the table is accessed to be sure that the priority level to which the engineer desires to change the priority is not 0. If is not, the priority of the work order is changed and priority table entry corresponding to the new priority level for that engineer is decremented by 1. In addition, if the job order is changed from a priority level other than 4, the table entry corresponding to the priority level from which the priority of the work order was changed is incremented by 1. If the value is 0, the engineer is so informed, and must choose a different priority value or not change the job's priority. It would be apparent to those skilled in the art that there are numerous ways in which the priorities can be tracked.

In a second embodiment of the present invention, engineers are allowed to borrow priorities from one another. Thus, if an engineer has used up all of his or her allocated level 1 priorities, the engineer can negotiate with another engineer to borrow a level 1 priority. If the other engineer can loan the priority the loan is made. Incrementing and decrementing as described above are performed for the priorities of the two engineers. However, in this case, the system tracks the ownership of the priority. When a work order having the loaned priority level is completed for the engineer to whom the loan was made, the priority level of the table entry for the loaning engineer is incremented. Whether the other engineer can loan the priority can be determined by querying the priority table. Allowing borrowing, provides an alternative for engineers that have emergency situations arise.

The priorities can be seen via reporting described below. Thus, the present invention provides an ability to manage, update and track the engineers' use of priorities.

Figure 2:
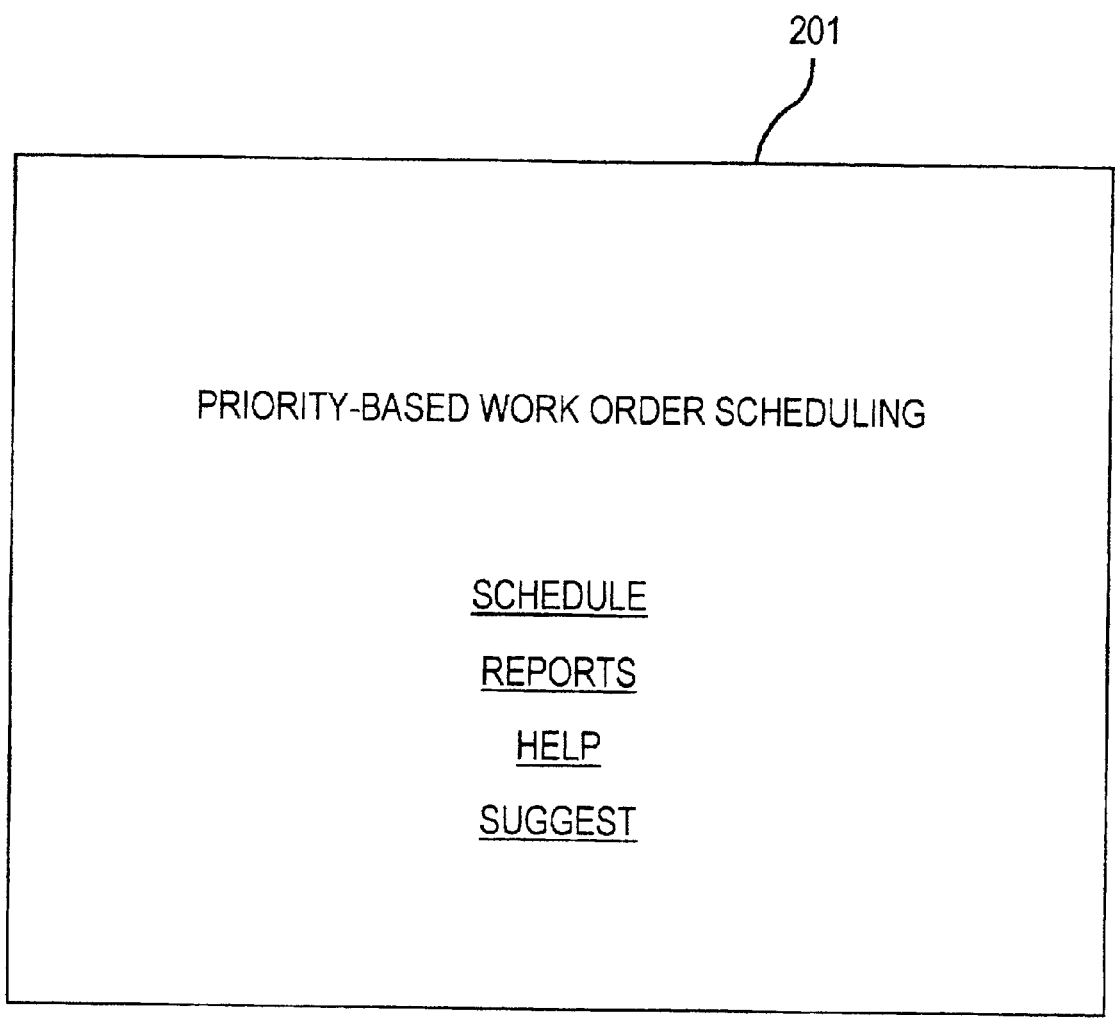
FIG. 2 is an exemplary home page for the GUI of the priority-based work order scheduling system of the present invention.

Using the present invention, users can obtain information regarding pending work orders, modify pending work orders, delete pending work orders and enter new work orders via a graphical user environment (GUI). Preferably the GUI is a web browser such as web browser 106. FIG. 2 is an exemplary home page 201 for the GUI of the priority-based work order scheduling system of the present invention. Home page 201 presents several choices for a user. The user can choose SCHEDULE, REPORTS, HELP and SUGGEST. Choosing SCHEDULE allows a user to search for and view work order scheduling. Choosing REPORTS allows a user to generate and view reports that display information regarding the work orders stored in DBMS 104. Choosing HELP allows a user to obtain help in using the priority-based work order system scheduling system of the present invention. Choosing SUGGEST allows a user to input suggestions for modifications or improvements to the work order scheduling system of the present invention.

Figure 3:
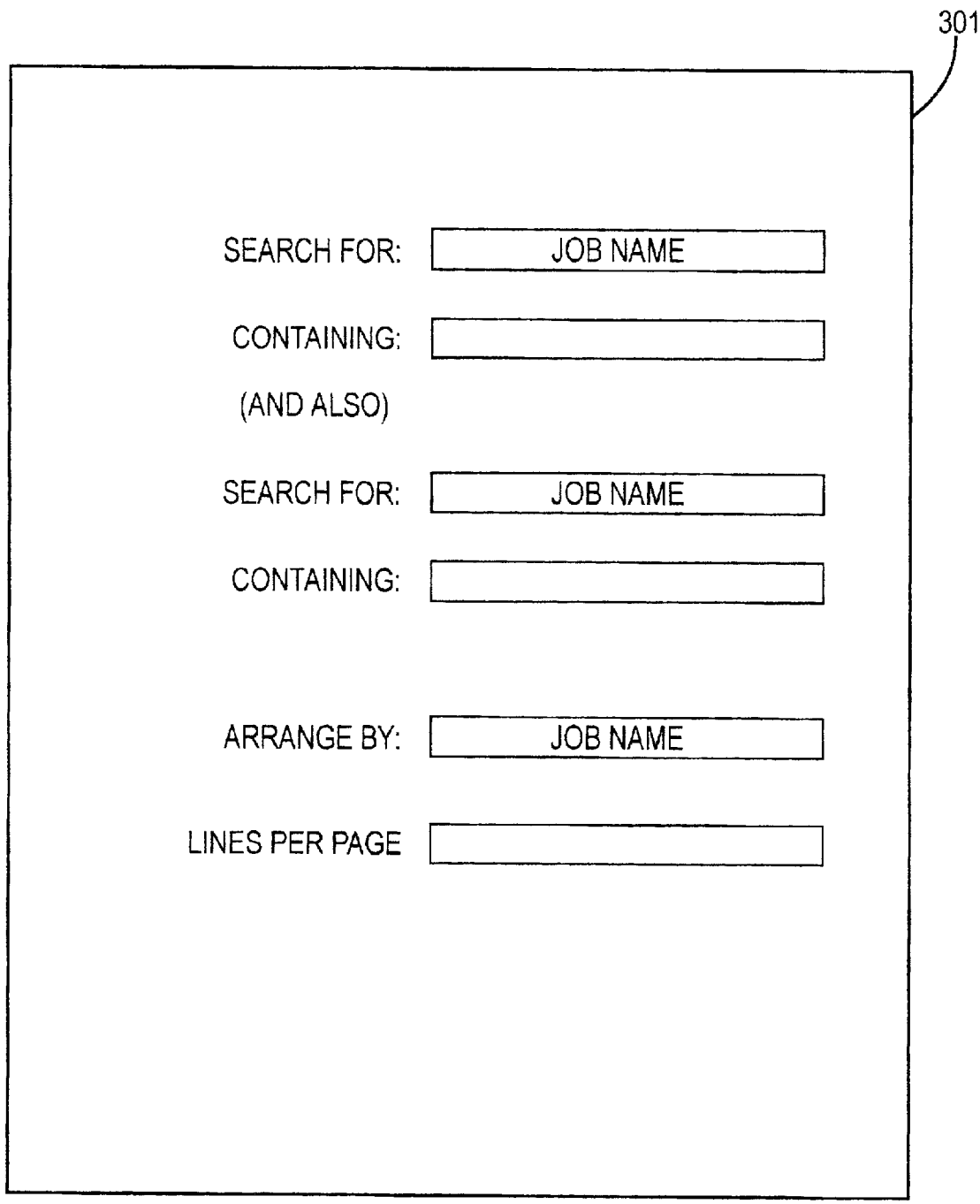
FIG. 3 illustrates an exemplary scheduling window that is displayed to a user when the user chooses the SCHEDULE button from the home page.

FIG. 3 illustrates an exemplary scheduling window 301 that is displayed to a user when the user chooses the SCHEDULE button from home page 201. Scheduling window provides the user with a search form for extracting work order information from DBMS 104. The user selects a category of information in the SCHEDULE window. Preferably, the SCHEDULE window is a pull down menu that contains a list of categories that the user can search for. For example, as shown the user is searching in the category JOB NAME. The JOB NAME category contains work orders by work order name. It would be apparent to those skilled in the art that any desired categories can be used. For example, categories such as ENGINEER NAME, CONSTRUCTION AGENT NAME and WORK ZONE can be used.

The selected category is searched for terms entered in the CONTAINING text block. Multiple categories and terms can be searched using addition SEARCH FOR/CONTAINING pairs. Any number of such additional pairs can be implemented, though only two have been explicitly shown in the present application. When the desired categories and terms are entered, the user selects the RETRIEVE WORK ORDERS button to submit the work order data request. In response to the user's selection, the system returns work order data corresponding to the request.

The jobs can be listed according to any category by selecting the category in the ARRANGE BY pull down menu. The categories can be listed alphabetically, numerically or in any other desired order, depending on the category and what is reasonable for that category. For example, jobs are generally listed alphanumerically. Engineers are generally listed alphabetically by last name. The default listing arrangement is by job name.

Work order data that is found as a result of the search or reports that are generated can be printed. The number of lines per page for printing can be input in the LINES PER PAGE text block. If there is a large amount of data to be printed, this value should be set high so that the largest number of lines is used per page. If left to a low number, for example, leaving this field blank, the present invention provides an index showing ranges. For example, if this field is set to 10, and there are 100 jobs to print, upon printing, 10 jobs will be displayed per page, with an index having ranges for printing jobs 1–10, 21–30, 31–40, . . . and 91–100.

Using the data entered in the SCHEDULE window, the system generates an information request. The system sends uses the information request as described above to search for and collect the work order data responsive to the information request. This information is gathered and displayed to the user. If the user does not select specific data to search for, the system defaults to returning to the user all of the work order information in DBMS server 104.

FIG. 4 is an exemplary scheduling display 401 that is shown to a user after the user makes the selection from the scheduling page. Scheduling display 401 has a number of columns or fields. The PRG field contains accounting information related to the reason for the job, for example, is the job for growth or repair. A more detailed understanding of this field is not required for to completely understand the present invention. The PRI field contains the priority of the job. Priorities are described in more detail below. The JOB field contains the name of the job. The ENG field contains the name of the engineer responsible for the job. The RSRC field contains the construction agent or group responsible for implementing the job. The REM HRS field contains the number of hours remaining in the job. The CA (Cable), HW (hard wire), PLGS (plugs), PRMIT (permit), SITE RDY (whether the site is ready), PRE CT (category of job) and GO fields are categories of statuses for a particular job. There is also a description field that contains to the first few characters of a detailed description of the job to help identify what the specific job is.

More particularly, the CA field represents via NORNA (needed, ordered, received, not applicable) fields the status or need of that material item. This field is modifiable by users of the present invention, unlike conventional systems. The HW field represent via NORNA fields the status or need of that material item. The HW field provides a way to report details, previously available only from a separate system, via a button. The HW field is used to provide information in the scheduling meeting regarding items that were discussed in another meeting. Consequently, providing the HW field is a time saving measure. The PLGS field is similar to the HW field just described. The PRMT field is a manual input via a button to indicate whether a permit to work has been obtained or is required from the municipality involved in a particular work order. The SITE RDY field indicates whether a remote electronic cabinet site has been prepared for installation. The PRE CT field indicates whether or not a particular job is a candidate for a pre-service order site visit by one or more installation technicians. The PRE CT field can be used, for example, to assist managers in scheduling installation technician visits to sites. The GO field is an indicator of whether a work order will be completed or not.

Initially, the REM HRS field is populated with a time estimate corresponding to the amount of time that estimated to be required to complete the job. This is determined from the tasks required to perform the job. Each job can be divided into a series of tasks. Each of these tasks is assigned a time estimate of the time required to complete the task. The time required to complete a job is estimated as the sum of the time estimates for each of the tasks required to complete the job. This sum is entered as the initial value of the REM HRS field for a particular job.

The REM HRS field is a dynamic field that is updated to reflect progress of the job. As described above, time reports from the construction agents are entered into MTR system 116. Preferably, the time reports are entered daily or nightly. These time reports contain the time that was spent on each job for the day. This time is subtracted from the REM HRS field of the job. Thus, each day, an estimate of the time required to complete a job is readily available by querying the REM HRS field for the job.

If a user desires more information about a particular job, or desires to change or update the parameters for a particular job, the user can choose the job from scheduling display 401. When the user makes such a choice, a work order display is shown to the user.

FIG. 5 illustrates a work order display 501 according to one embodiment of the present invention. Work order display 501 contains the job name followed by a priority selection. If the user has update rights, the user can update the priority by selecting one of the radio buttons corresponding to the desired priority. Work order display 501 also includes radio buttons for updating or reviewing the categories plugs, cable, hardwire and permit. These categories can be updated by selecting the radio buttons corresponding to Needed (N), Ordered (O), Received (R) or Not Applicable (NA). Work order display 501 also includes radio buttons for updating or reviewing the categories site ready, Pre-CT, Go and Ehab Go. These categories can be updated by selecting Yes (Y), No (N) or Not Applicable (NA).

In addition, work order display 501 includes additional status categories. These categories standardize responses that are received to questions that arise during scheduling meetings. These questions can be asked during a scheduling meeting and the answers input using the present invention by selecting the appropriate radio button. For example, in a job requiring contract work, the status of the contract can be entered. Where a line crew is required, the status of the line crew can be entered. The same is true for splicing requirements and electronics package (DLC) requirements. These parameters can also be changed by an engineer that has authority to make changes to a work order outside the scheduling meeting. Authorization can be provided using well-known user name/password security schemes.

Work order display 501 also provides standard terminology that serves to standardize the terminology used by the participants in the scheduling process. That is, by providing radio buttons, the system of the present invention forces the user to press a button that is converted into a standard text, rather than having the user enter in his or her own individual notations.

Figure 6:
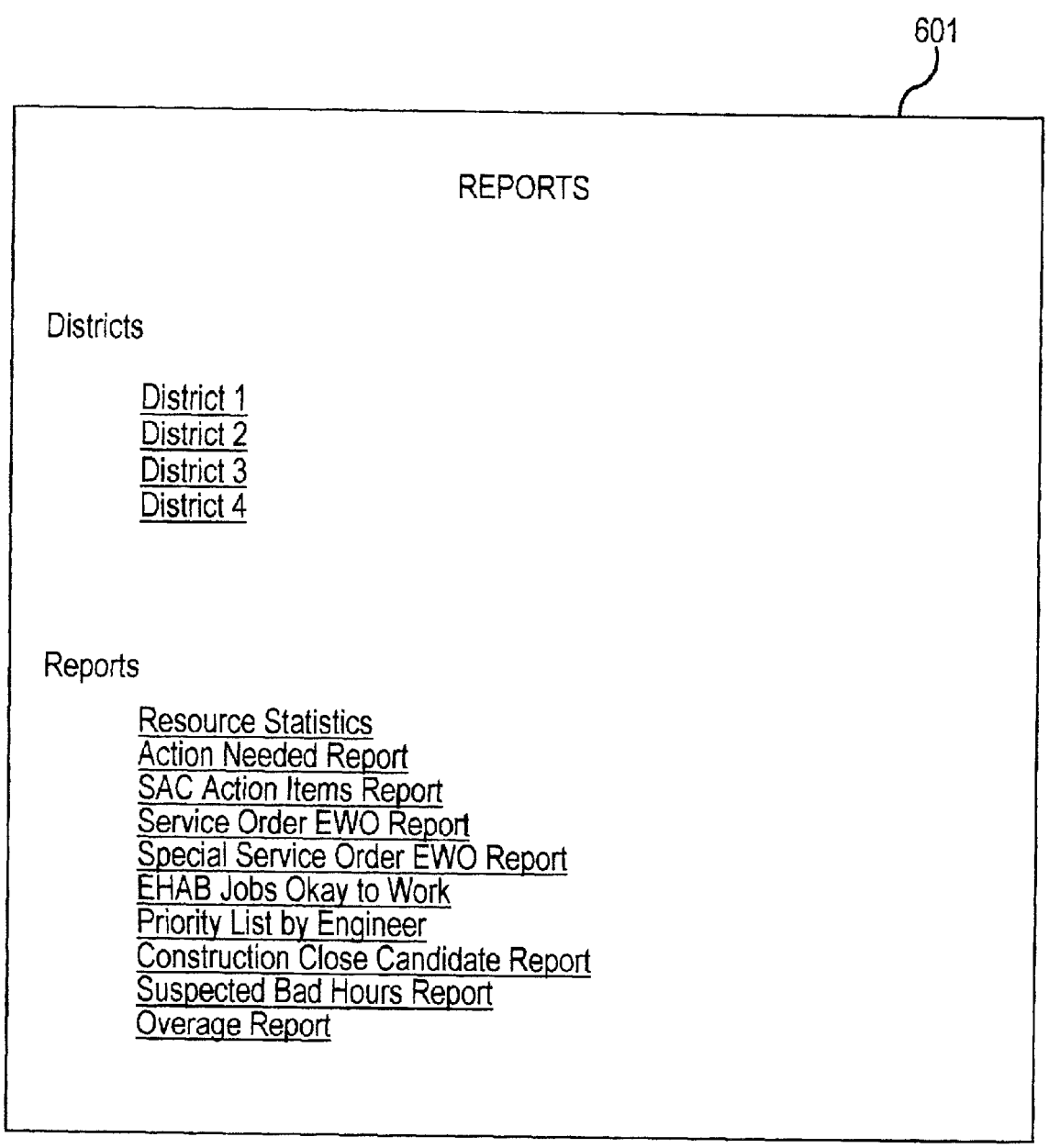
FIG. 6 illustrates an exemplary report display.

The present invention provides various reports to obtain work order information. FIG. 6 illustrates an exemplary report display 601. As can be seen in FIG. 6, there are a number of reports that are available. Each report provides a display of some portion of the work order information contained in DBMS 104. The number and types of reports are arbitrary, and can be designed in accordance with implementation specifics. Consequently, reports can be configured as required by a particular implementation of the present invention.

In addition, where a responsibility for engineering design and construction is divided into districts, the reports can be generated for each district. Generally, one engineer and one or more construction agents are responsible for each district. For example, in FIG. 6, there are 4 districts. According to the present invention, reports can be generated for any district by selecting that district. The default is to generate a report for all districts. A report is preferably generated at the time that it is requested by the user, for example, when the user selects the particular report from report display 601.

The Resource Statistics report provides information regarding resource use. The Action Needed report provides a listing of those work orders for which an action needed item is set in the NOTES field of the work order. The suspected bad hours report generates a report of those work orders that the system determines are not viable work orders. Such "test" work orders are used by engineers as placeholders and are to be deleted when the engineer is finished with it. However, oftentimes the test work orders are not deleted. Construction agents cannot be sure that the test work order are not to be implemented. Consequently, to the extent that construction agents attempt to implement them or concern themselves with their implementation, there are inefficiencies introduced by the test work orders. This report is a listing of the test work orders.

An example of two of the reports is provided in detail below. FIG. 7 illustrates a Resource Statistics display 701. Resource statistics display provides information related to construction agent loading. The report provides an identification of resources by resource forepersons, the estimated time remaining for to complete the work orders each foreperson is assigned, the number of construction agents working on those work orders, and the estimated time remaining in manpower weeks. For example, a construction manager can look at report 701 and see that Bob and Ted have less than a week's worth of work, while Erica has almost 7 weeks worth of work. Using this display, the construction manager could redistribute resources to more evenly balance the load on construction agents. In addition, for the present example, Bill has decided to leave the company. The construction manager can also see that Bill's work orders are almost complete.

The present invention also allows engineers' current priorities usage to be reviewed. FIG. 8 is an exemplary priority report 801 that shows, by engineer, what priorities the engineer has used and what priorities remain. Preferably, the listing of engineers are arranged in alphabetical order. The priority data gives a current indication of priority usage for each engineer in the list. For example, the priority data in priority report 801 indicates that Bill is using 10 of his allocated priorities. He is using all five of his level 1 priorities, 3 of his level 2 priorities and 3 of his level 3 priorities. Joe, on the other hand, indicates 6 level 1 priorities. This is an example of borrowing, where Joe has borrowed a level 1 priority from another engineer.

The present invention can be used during scheduling meetings to manage work orders and modifications of work orders. For example, the work order information is accessible to any person using a web browser that has appropriate authorization. Such a person, for example, the scheduling manager responsible for the scheduling meeting, can access work order information, modify work order information, delete work order information, add work order information or otherwise update work order information by navigating the displays and windows described above. Any changes that are made are stored in the system at the time the change is made. Thus, there is little, or no, loss of knowledge due to inaccurate or incomplete notes because the knowledge of the scheduling meeting is captured and stored during the scheduling meeting.

In addition, to its use during scheduling meetings, the present invention can be used by engineers to modify work orders for which they are responsible, outside the context of a scheduling meeting. That is, engineers can be authorized to modify the work order data for the work orders they are responsible for using the above-described GUI displays. For example, engineers can allocate, update or change work order priorities, within the allotted priorities. Providing engineers access to the work order system reduces the need for and number of scheduling meetings. In addition, scheduling meetings will be reduced in duration. The risks associated with work order modifications made with considering the requirements of other engineers are essentially eliminated because the priorities can only be allocated on the basis of the allotted priorities. Engineers know they only have so many of each priority level to allocate. In the case, where an engineer "borrows" a priority, the needs of the loaning engineer are taken into account as there will be no loan if the loaning engineer does not believe such a loan is consistent with his or her needs.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for managing work orders using priorities, comprising:

a work-order entry computer for entering a plurality of work-orders;

a database management system coupled to the work-order entry computer for storing work-order information related to the plurality of work orders;

a work order management computer;

a time estimation process executing on the work order management computer for assigning a time estimate to each work order entered, the time estimate corresponding to the time estimated to be required to complete the work order;

a priority assigning process executing on the work order management computer which a user can use to assign a priority to at least one of the plurality of entered work orders, the priority assigning process allocating to each engineer a pre-determined number of priorities for a pre-determined number of priority levels;

the priority assigning process tracking a remaining number of priorities at each priority level for each engineer, and when the remaining number of priorities for a particular priority level is zero, then the priority assigning process not permitting an engineer to assign another work order to that particular priority level;

the priority assigning process permitting the engineer to borrow priorities from other engineers, wherein when the engineer has no remaining priorities in that particular priority level, then the priority assigning process permits the engineer to negotiate with the other engineers to borrow a priority in that particular priority level, the priority assigning process querying to determine whether another engineer may loan a priority; and a graphical user interface executing on the work order management computer in which a user can update at least a portion of the work-order information stored in the database management system.

2. The system recited in claim 1, wherein the priority assigning processes tracks priority usage for each engineer that assigns a priority to a work order.

3. The system recited in claim 1, wherein the user can use the graphical user interface to request a report containing at least a portion of the work-order information stored in the database management system.

4. The system recited in claim 1, wherein the graphical user interface includes a SCHEDULE window which a user can use to enter a search to extract at least a portion of the work order information stored in the database management system.

5. The system recited in claim 1, wherein the graphical user interface is a web browser.

6. The system recited in claim 1, wherein the work-order information is updated periodically.

7. The system recited in claim 6, wherein the work-order information is updated once a day.

8. A method for managing work order scheduling using priorities, comprising:

entering a work-order;

storing work-order information related to the work order;

assigning a time estimate to each work order entered, the time estimate corresponding to the time estimated to be required to complete the work order;

assigning a priority to at least one of the plurality of entered work orders;

allocating each engineer a pre-determined number of priorities for a pre-determined number of priority levels;

tracking a remaining number of priorities at each priority level for each engineer, and when the remaining number of priorities for a particular priority level is zero, then not permitting an engineer to assign another work order to that particular priority level;

querying to determine whether another engineer may loan a priority, such that when the engineer has no remaining priorities in that particular priority level, then permitting the engineer to negotiate with the other engineers to borrow a priority in that particular priority level; and providing a graphical user in which a user can update at least a portion of the work-order information stored in the database management system.

9. The method recited in claim 8, comprising the step of tracking priority usage for each engineer that assigns a priority to a work order.

10. The method recited in claim 8, further comprising the step of requesting a report containing at least a portion of the work-order information stored in the database management system via the graphical user interface.

11. The method recited in claim 8, further comprising the step of extracting at least a portion of the work-order information using a SCHEDULE window of the graphical user interface.

12. The method recited in claim 8, further comprising the step of periodically updating the work-order information.

13. The method recited in claim 12, further comprising the step of updating the work-order information once a day.

14. A system for priority-based work order scheduling, comprising:

a work order entry computer to input a work order, the work order entry computer determining a time estimate of the time required to complete the work order;

a database management system to store work order data corresponding to the work order and corresponding time estimate;

a user computer executing a graphical user interface by which a user can assign a priority to the work order data, the user computer determining that the user has sufficient priority available to make the priority assignment, wherein the user computer allocates a predetermined number of priorities for a predetermined number of priority levels to the user, and the user computer tracks the user's priority assignments, the user computer tracking a remaining number of priorities at each priority level for each engineer, and when the remaining number of priorities for a particular priority level is zero, then the user computer will not permit an engineer to assign another work order to that particular priority level, the user computer permitting the engineer to borrow priorities from other engineers, wherein when the engineer has no remaining priorities in that particular priority level, then the user computer permits the engineer to negotiate with the other engineers to borrow a priority in that particular priority level, the user computer querying to determine whether another engineer may loan a priority.

15. The system recited in claim 14, wherein the graphical user interface provides a display by which the user can query the database management system to extract a portion of the work order data in a report.

16. The system recited in claim 14, wherein the user computer decrements the number of priorities corresponding to the level of the priority that the user assigns to the work order data when the user makes the priority assignment, and increments number of priorities corresponding to the level of the priority that the user assigns to the work order data when the work order is completed.

17. The system recited in claim 15, wherein the report is a priority report showing the user's use of priorities.

18. A method for priority-based work order scheduling, comprising the steps of:

entering a work order;

determining a time estimate of the time required to complete the work order;

storing work order data corresponding to the work order and corresponding time estimate;

assigning a priority to the work order data;

allocating a predetermined number of priorities for a predetermined number of priority levels to the user;

determining whether there is sufficient priority available to make the priority assignment;

when a remaining number of priorities for a particular priority level is zero, then not permitting the user to assign another work order to that particular priority level; and querying to determine whether another user may loan a priority, such that when the user has no remaining priorities in that particular priority level, then permitting the user to negotiate with the another user to borrow a priority in that particular priority level.

19. The method recited in claim 18, further comprising the step of querying the database management system to extract a portion of the work order data in a report.

20. The method recited in claim 18, further comprising the step of tracking the user's priority assignments.

21. The method recited in claim 20, further comprising the steps of:

decrementing the number of priorities corresponding to the level of the priority that the user assigns to the work order data when the user makes the priority assignment; and incrementing number of priorities corresponding to the level of the priority that the user assigns to the work order data when the work order is completed.

22. The system recited in claim 19, further comprising the step of generating a report showing the user's use of priorities.

23. A system for priority-based scheduling of telephone company work orders, comprising:

means for entering a work order;

means for estimating a time to complete the work order;

means for storing work order data associated with the work order and time estimate to complete the work order;

means for associating a priority with the work order, and storing the associated priority with the work order data;

means for allocating a pre-determined number of priorities for a pre-determined number of priority levels;

means for determining when a remaining number of priorities for a particular priority level is zero, and then not permitting assignment of another work order to that particular priority level; and means for querying to determine whether a priority may be loaned, such that when the particular priority level has no remaining priorities, then negotiation is permitted to borrow a priority in that particular priority level.

24. The system recited in claim 23, further comprising means for tracking the time remaining to complete the work order on a continuing basis.

25. The system recited in claim 24, wherein the means for tracking comprises means for periodically updating the work order data.

26. The system recited in claim 23, further comprising means for tracking the allocation to determine if a particular priority can be assigned.

27. The system recited in claim 23, further comprising:

means for determining a series of tasks required to complete the work order;

means for assigning a time required to complete each task; and means for summing the time required to complete each task to estimate the time required to complete the work order.

* * * * *